United States Patent
Pal

(10) Patent No.: US 9,013,637 B2
(45) Date of Patent: *Apr. 21, 2015

(54) SET-TOP BOX RECEIVER SOFT CONTROL SYSTEM AND METHOD

(71) Applicant: EchoStar Technologies L.L.C., Englewood, CO (US)

(72) Inventor: Rajiv Singh Cullen Pal, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,103

(22) Filed: May 19, 2014

(65) Prior Publication Data

US 2014/0259063 A1    Sep. 11, 2014

Related U.S. Application Data

(63) Continuation of application No. 13/657,596, filed on Oct. 22, 2012, now Pat. No. 8,730,406, which is a continuation of application No. 12/251,250, filed on Oct. 14, 2008, now Pat. No. 8,294,831.

(51) Int. Cl.
   *H04N 5/44* (2011.01)
   *H04N 21/422* (2011.01)
   *H04N 21/47* (2011.01)
   *H04N 21/482* (2011.01)

(52) U.S. Cl.
   CPC ... *H04N 21/42206* (2013.01); *H04N 21/42204* (2013.01); *H04N 21/47* (2013.01); *H04N 21/482* (2013.01); *H04N 2005/4441* (2013.01)

(58) Field of Classification Search
   CPC ............ H04N 21/4126; H04N 21/42204; H04N 21/42219; G06F 3/033; G06F 3/04
   USPC ............... 725/38, 151; 715/835, 839, 866; 348/734
   See application file for complete search history.

(56) References Cited

U.S. PATENT DOCUMENTS

| | | | | |
|---|---|---|---|---|
| 5,604,544 A * | 2/1997 | Bertram | | 348/601 |
| 5,675,395 A * | 10/1997 | Martin et al. | | 348/734 |
| 5,936,611 A * | 8/1999 | Yoshida | | 345/158 |
| 6,104,334 A * | 8/2000 | Allport | | 341/175 |
| 6,215,417 B1 * | 4/2001 | Krass et al. | | 341/20 |
| 6,292,283 B1 * | 9/2001 | Grandbois | | 398/107 |
| 6,501,516 B1 * | 12/2002 | Clapper | | 348/734 |
| 6,574,083 B1 * | 6/2003 | Krass et al. | | 361/115 |
| 7,132,973 B2 * | 11/2006 | Jindal | | 341/176 |

(Continued)

*Primary Examiner* — Pankaj Kumar
*Assistant Examiner* — Timothy Newlin
(74) *Attorney, Agent, or Firm* — Lowe Graham Jones PLLC

(57) ABSTRACT

A set-top box is constructed including a processor, an input port, an auxiliary input port, and an output port. The input port is electrically coupled to the processor, and is configured to receive first control signals from a remote control. The auxiliary input port is also electrically coupled to the processor, and is configured to receive second control signals from an auxiliary remote control and send the second control signals to the processor. The output port is electrically coupled to the processor, and is configured to send graphical representations of a remote control to a display. The processor is configured to compose a graphical representation of the remote control, receive a second control signal, modify the graphical representation of the remote control in response to the second control signal, and send the graphical representation to the output port for display.

20 Claims, 6 Drawing Sheets

(56) References Cited

U.S. PATENT DOCUMENTS

| | | | |
|---|---|---|---|
| 7,581,182 B1* | 8/2009 | Herz | 715/713 |
| 7,644,426 B2* | 1/2010 | Suh | 725/43 |
| 7,831,930 B2* | 11/2010 | Dresti et al. | 715/835 |
| 2001/0035860 A1* | 11/2001 | Segal et al. | 345/173 |
| 2004/0210933 A1* | 10/2004 | Dresti et al. | 725/40 |
| 2005/0162397 A1* | 7/2005 | Kwon et al. | 345/169 |
| 2006/0010481 A1* | 1/2006 | Wall et al. | 725/151 |
| 2008/0263618 A1* | 10/2008 | White | 725/133 |
| 2009/0161027 A1* | 6/2009 | Hardacker et al. | 348/734 |
| 2009/0233593 A1* | 9/2009 | Ergen et al. | 455/420 |

* cited by examiner

SET-TOP BOX RECEIVER SOFT CONTROL SYSTEM AND METHOD

PRIORITY CLAIM

This patent application is a Continuation of U.S. Non-Provisional patent application Ser. No. 13/657,596, filed Oct. 22, 2012, published as U.S. Publication No. 2013/0044262, entitled "SET-TOP BOX RECEIVER SOFT CONTROL SYSTEM AND METHOD," and issued to U.S. Pat. No. 8,730,406 on May 20, 2014, which is a Continuation of U.S. Non-Provisional patent application Ser. No. 12/251,250, filed Oct. 14, 2008, published as U.S. Publication No. 2010/0095346, entitled "SET-TOP BOX RECEIVER SOFT CONTROL SYSTEM AND METHOD," and issued to U.S. Pat. No. 8,294,831 on Oct. 23, 2012, the contents of which are herein incorporated by reference in their entireties.

BACKGROUND OF THE INVENTION

1. Field of the Invention

This disclosure is related to the field of set-top boxes, and, in particular, to set-top boxes including a soft control feature.

2. Description of the Prior Art

Set-top boxes are used in a wide variety of consumer applications. For example, satellite television set-top boxes are used to receive, decode, and display satellite television signals on a television. Many set-top boxes include remote controls capable of controlling the set-top box in a wide variety of manners. These remote controls are often complex and include a large quantity of buttons or other controls. In contrast, the set-top box itself often has a very limited set of controls built into the box, since it is designed for control exclusively by the remote control.

Current set-top boxes typically include a power switch, and perhaps a small number of very simple control buttons, such as for incrementing and decrementing the presently tuned channel. Since the remote controls are typically smaller than the set-top box, and are often wireless devices, they may be located separately from the set-top box, making them vulnerable to misplacement. When a remote control is lost, the user is left without any control over the set-top box other than the very limited controls built into the box.

SUMMARY OF THE INVENTION

A set-top box is constructed including a processor, an input port, an auxiliary input port, and an output port. The input port is electrically coupled to the processor, and is configured to receive first control signals from a remote control. The auxiliary input port is also electrically coupled to the processor, and is configured to receive second control signals from an auxiliary remote control and send the second control signals to the processor. The output port is electrically coupled to the processor, and is configured to send graphical representations of a remote control to a display. The processor is configured to compose a graphical representation of the remote control, receive a second control signal, modify the graphical representation of the remote control in response to the second control signal, and send the graphical representation to the output port for display.

DETAILED DESCRIPTION OF THE PREFERRED EMBODIMENT

Figure 1:
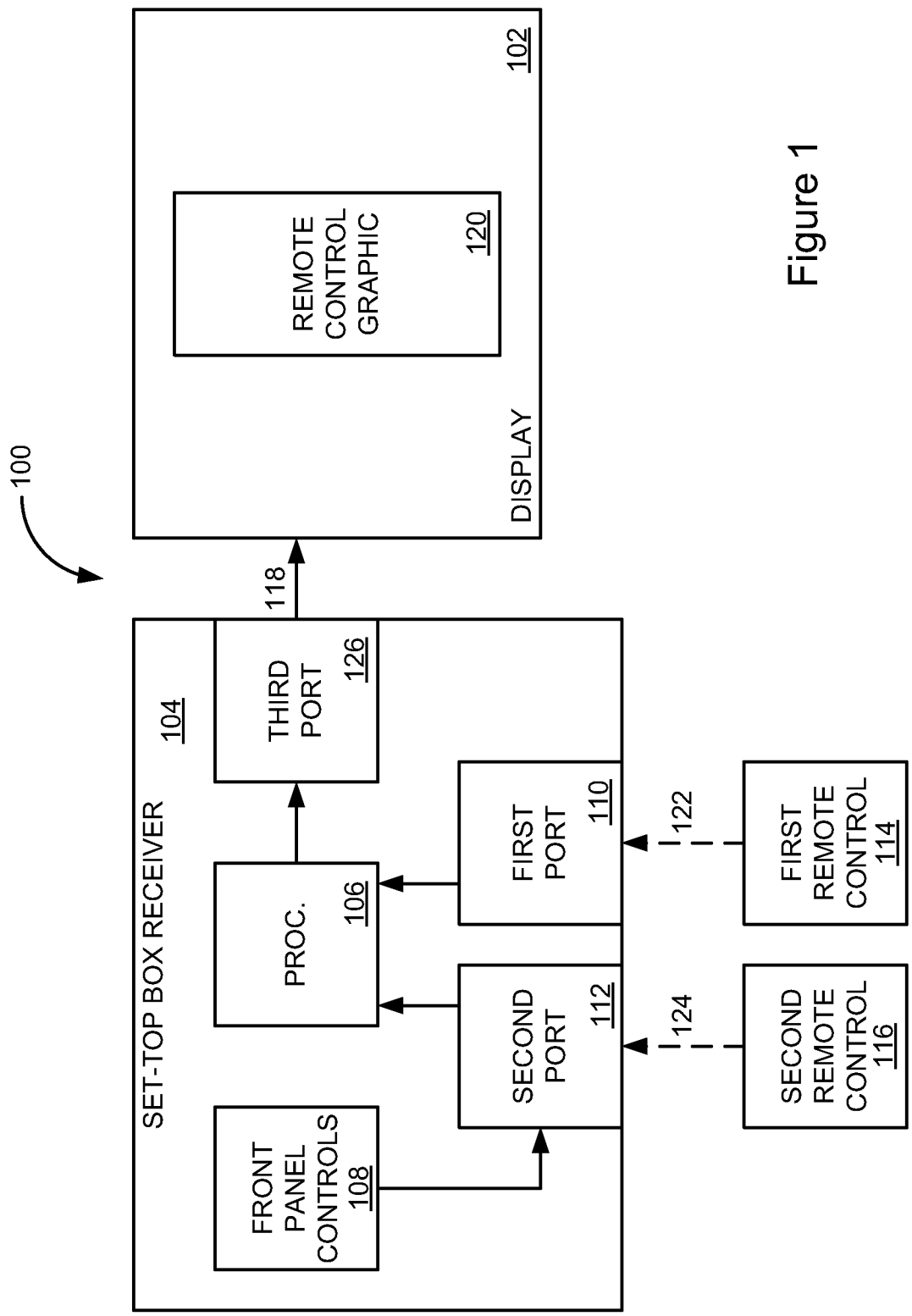
FIG. 1 is a block diagram of a set-top box receiving system.

FIG. 1 is a block diagram of a set-top box receiving system 100. In this example, set-top box receiving system 100 includes set-top box receiver 104 and display 102. Set-top box receiver 104 includes processor 106, front panel controls 108, first port 110, second port 112, and third port 126.

Third port 126 of set-top box receiver 104 is coupled to display 102 through link 118, typically a video cable. First remote control 114 is coupled to first port 110 through link 122, and second remote control 116 is coupled to second port 112 through link 124. Links 122 and 124 may be wired or wireless links. Some links may operate through infrared signals, while others may use radio frequency signals. Still other links may be directly wired.

Figure 6:
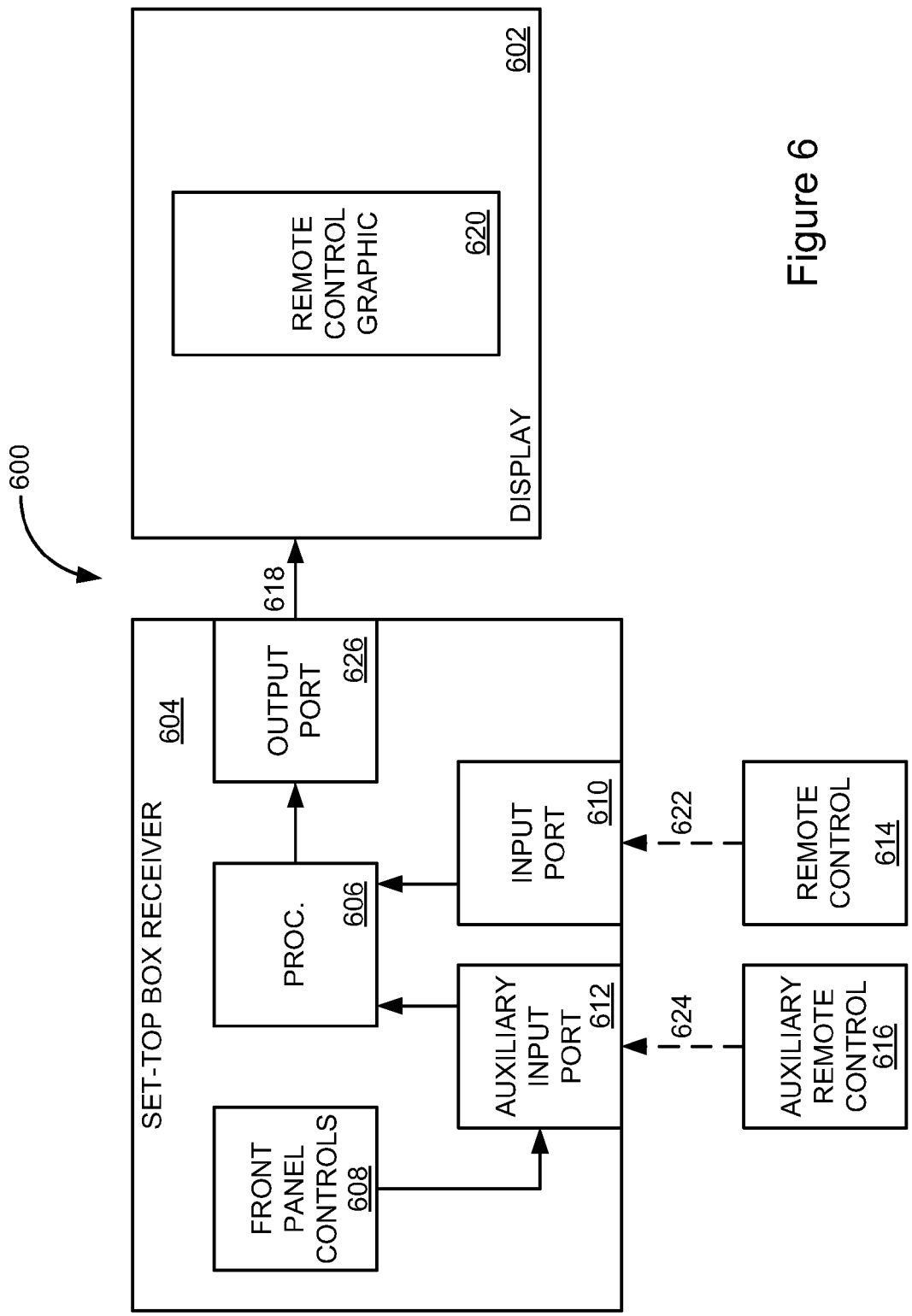
FIG. 6 is a block diagram of a set-top box receiving system.

In some embodiments, first port 110 is also termed an input port, second port 112 is termed an auxiliary input port, and third port 126 is termed an output port. First remote control 114 may be referred to as a remote control, while second remote control 116 may be referred to as an auxiliary remote control. Such an embodiment is illustrated in FIG. 6 and described in detail below.

Processor 106 is electrically coupled with first port 110, second port 112, and third port 126. In this example, set-top box receiver 104 includes a quantity of front panel controls 108. Front panel controls 108 are coupled to processor 106 through second port 112 and may act as a second remote control in some examples. First remote control 114 includes control devices (not shown) such as buttons used for controlling set-top box receiver 104. Front panel controls 108 include a subset of the control devices present in first remote control 114. For example, these front panel controls 108 may include a power switch, direction controls, and a select button, while first remote control 114 may include a large number of additional control devices used to access all of the functionality present in set-top box 104.

Figure 4:
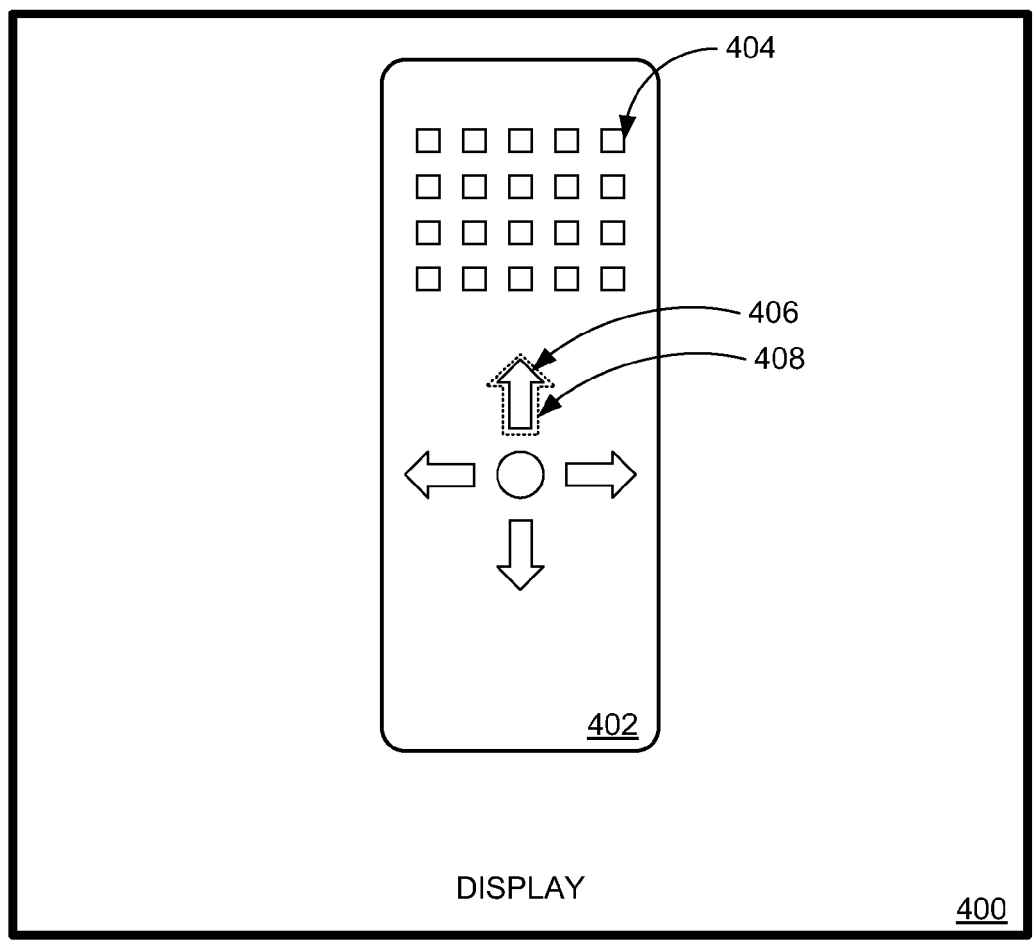
FIG. 4 illustrates a display including a graphical representation of a remote control.
Figure 5:
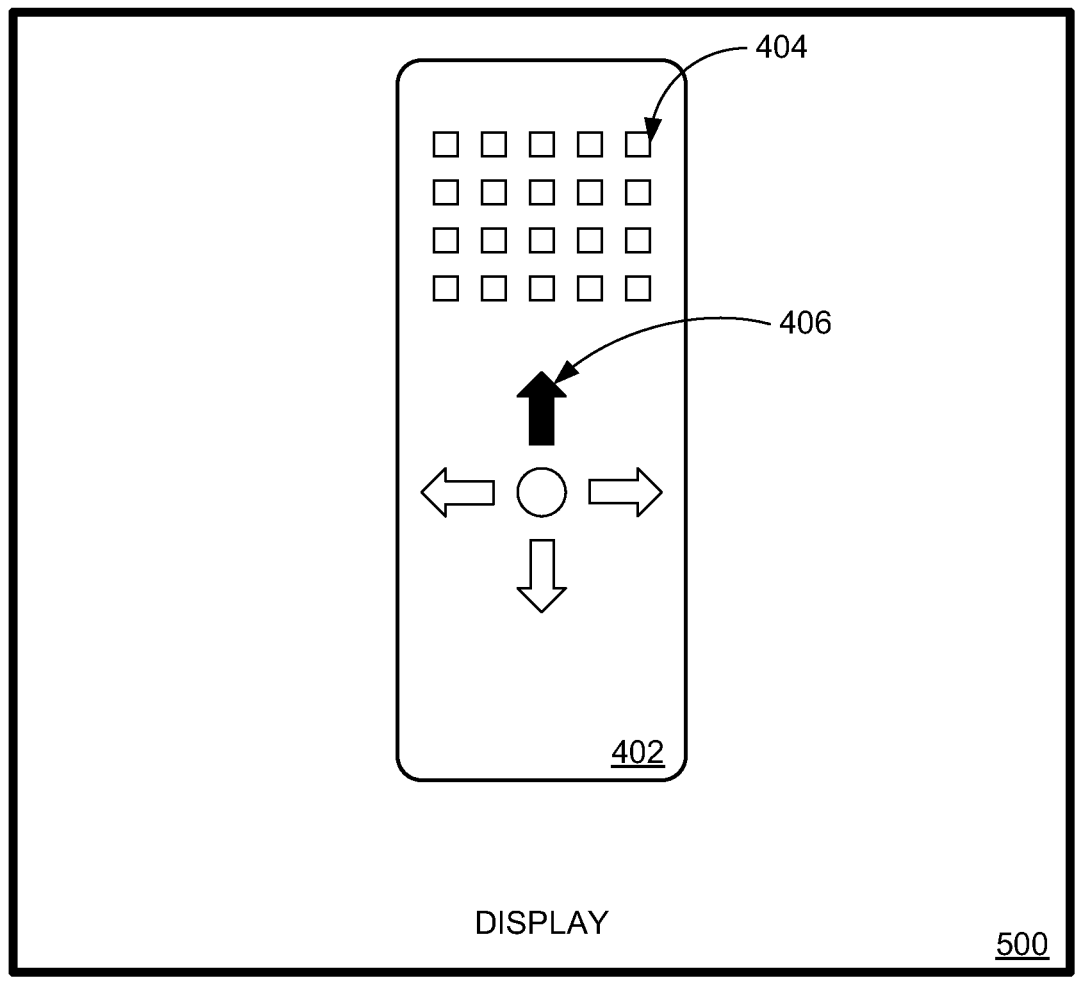
FIG. 5 illustrates a display including a graphical representation of a remote control.

When first remote control 114 is misplaced, a user may be unable to access all of the functionality present in set-top box 104. By displaying an interactive graphical representation 120 of first remote control 114 on display 102, and allowing the use of second remote control 116, a user is able to access all of the functionality of set-top box 104. For example, set-top box receiver 104 may create a graphical representation 120 of first remote control 114 and send it to output port 126 for viewing on display 102. An example display 102 is illustrated in FIGS. 4 and 5.

In this example, processor 106 is configured to receive control signals from second remote control 116 through second port 112 and to modify the graphical representation of first remote control 114 on display 102 in response to these control signals. Second remote control 116 may be any of a wide variety of control devices. For example, a set of front panel controls, a computer mouse, a joystick, a video game controller, a television controller, a remote control for a different set-top box, or the like may all be used as second remote controls in various embodiments of set-top box receiving system 100.

Various embodiments of second port 112 may include one or more different input ports. For example, in order to allow the use of a wide range of second remote controls, second port 112 may include a Universal Serial Bus (USB) port, an infrared port, and a radio frequency port. Other examples may use other types and configurations of second ports 112 as desired.

In an example, front panel controls 108 may include sufficient controls to operate as a second remote control. In this case, set-top box receiver 108 may not necessarily include an external second port 112, but use the front panel controls 108 as second remote control 116.

In still other examples, first port 110 and second port 112 may be physically combined into a single port capable of receiving control signals from both first remote control 114 and second remote control 116. First port 110 and second port 112 are illustrated in FIG. 1 as physically separate devices for purposes of clarity.

Figure 3:
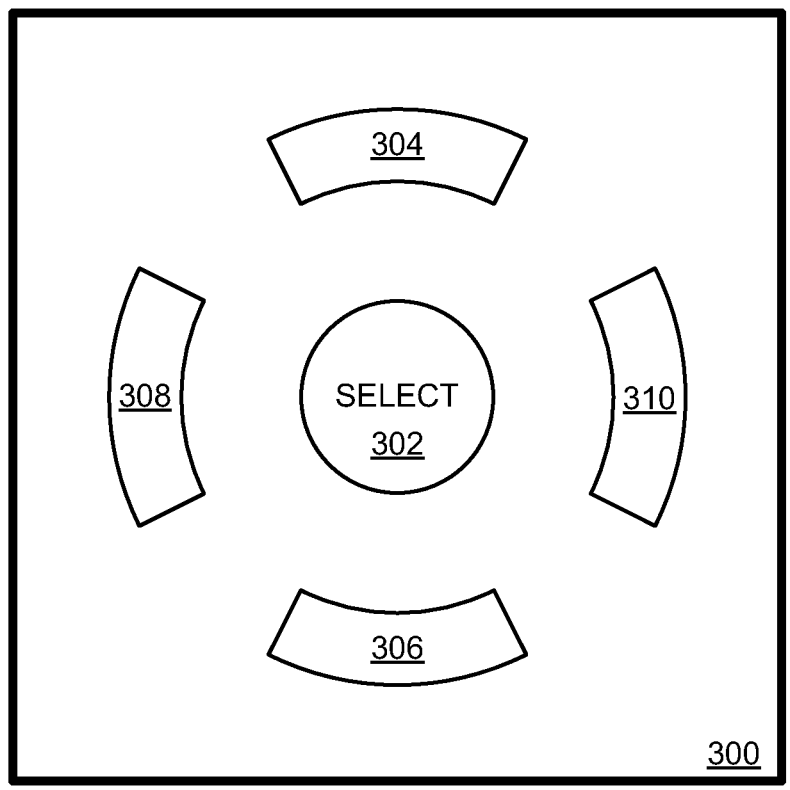
FIG. 3 illustrates an auxiliary remote control.

When set-top box receiver 104 is responding to second remote control 116, it displays a graphical representation 120 of first remote control 114 (or any other remote control) on display 102. This graphical representation 120 is modified by set-top box receiver 104 responsive to the control signals from second remote control 116. For example, second remote control 116 may include up, down, left, right, and select controls. An example second remote control 116 is illustrated in FIG. 3. The graphical representation 120 of first remote control 114 includes a cursor indicating one of the buttons on the graphical representation 120 of first remote control 114. When the up, down, left, and right controls are selected on second remote control 116, the cursor on the graphical representation 120 moves to a different button according to the direction selected.

When the cursor is located on a graphical representation of a button that the user wishes to select, the select control on second remote control 116 may be pressed. This causes second remote control 116 to send a control signal to set-top box receiver 104. In response to this control signal, set-top box receiver 104 performs the function corresponding to the button selected on the graphical representation 120 of first remote control 114. In this manner, a user may operate set-top box receiver 104 to perform any operation available from first remote control 114. The graphical representation 120 of first remote control 114 on display 102 may be in any size, shape, and location as necessary in any particular embodiment.

Set-top box receiver 104 may contain additional elements not illustrated in FIG. 1 for purposes of clarity. These elements may include a down-converter, one or more tuners, a demodulator, demultiplexer, decryption circuit, audio and video decoders, and the like, for receiving the satellite signals and transferring them to the television or other output device.

In one embodiment, processor 106 may be one or more microprocessors, microcontrollers, digital signal processors (DSPs), or any other processor configured to execute software instructions for performing the various tasks identified with the processor 106, such as coordinating the activities of the other components of the set-top box receiver 104, as well as the specific operations discussed in greater detail below. The software may be stored in a data storage device, or a memory located internal to the processor 106. In another example, processor 106 may be a collection of hardware logic circuitry to perform the functions described below, or a combination of software and hardware elements.

In some examples, the graphical representation 120 of a remote control on display 102 may be a representation of a remote control different from the first remote control 114 in possession of the user. This allows a user to test the functionality of various different remote controls prior to purchasing an additional remote control.

Figure 2:
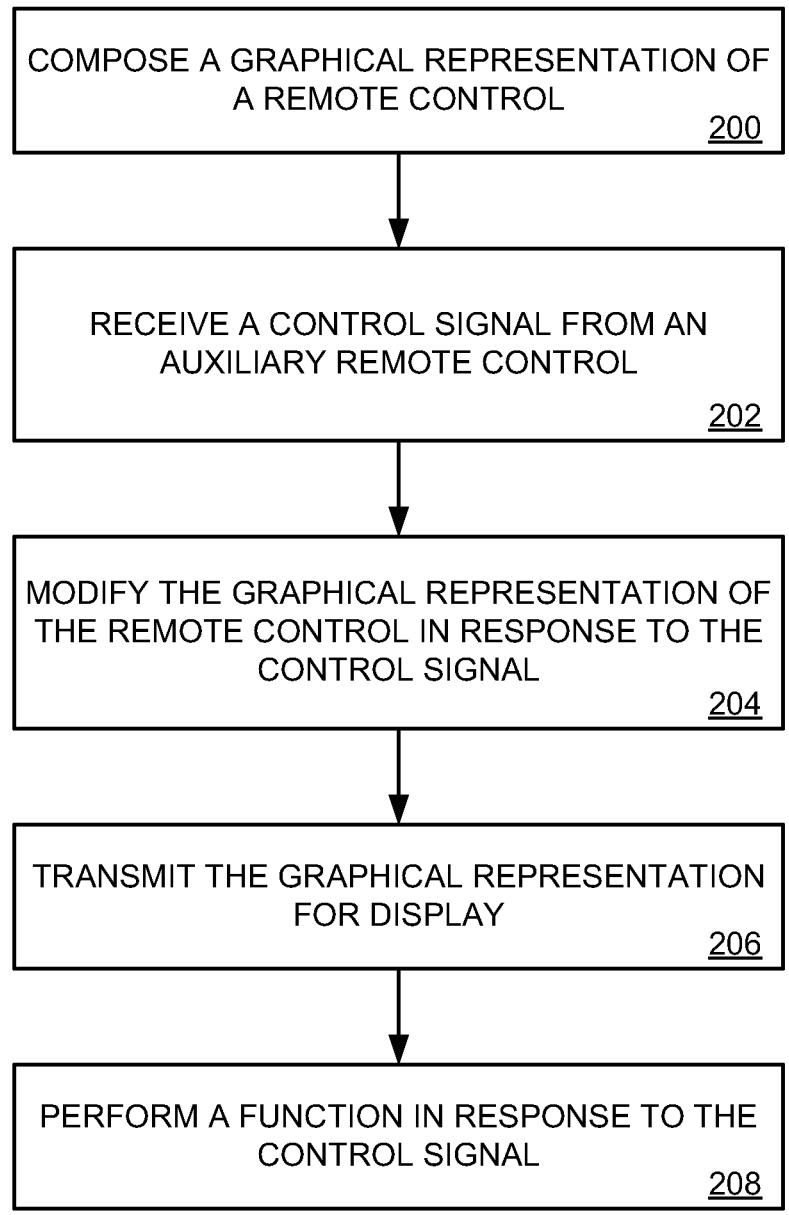
FIG. 2 is a flow chart of a method for operating a set top box.

FIG. 2 is a flow chart of a method for operating a set top box. Set-top box receiver 104 composes a graphical representation 120 of (first) remote control 114 (operation 200). Set-top box receiver 104 also receives a control signal from an auxiliary (second) remote control 116 (operation 202). In response to this control signal, set-top box receiver 104 modifies the graphical representation 120 of (first) remote control 114 (operation 204).

This modification may include moving a cursor over various graphical representations of buttons within graphical representation 120 of (first) remote control 114. In other examples, this modification may include indicating the selection of a button within graphical representation 120 of (first) remote control 114.

Set-top box receiver 104 transmits the graphical representation 120 for display on display 102 (operation 206). In some examples, set-top box receiver 104 also performs a function in response to the control signal (operation 208). Various functions may be performed by set-top box receiver 104 in response to the control signal. Such functions may include changing a channel, adjusting a volume level, selecting a program for recording, or the like. Any function capable of control by (first) remote control 114 may be performed in response to the control signal.

FIG. 3 illustrates an auxiliary (second) remote control 300. In this example, auxiliary (second) remote control 300 includes five buttons. These five buttons include four direction buttons and select button 302. The four direction buttons include up button 304, down button 306, left button 308, and right button 310. These buttons are used in conjunction with set-top box receiver 104 to modify a graphical representation 120 of (first) remote control 114 on display 102, and to cause set-top box receiver 104 to perform one or more functions.

For example, the four direction buttons 304, 306, 308, and 310 may be used to control the position of a cursor over the buttons shown in the graphical representation 120 of (first) remote control 114 on display 102. The select button 302 is then used to activate the button shown in the graphical representation 120 of (first) remote control 114 on display 102. The graphical representation 120 of (first) remote control 114 on display 102 is further illustrated in FIGS. 4 and 5.

FIG. 4 illustrates a display including a graphical representation of a remote control on a display 400. In this example, display 400 includes a graphical representation of a remote control 402. This graphical representation includes a large number of buttons 404. In this illustration, up arrow button 406 is shown designated by cursor 408, represented by a dashed line surrounding up arrow button 406. In one example, this cursor may be moved to other buttons 404 through use of the direction buttons included on auxiliary (second) remote control 300.

FIG. 5 illustrates a display including a graphical representation of a remote control on a display 500. Display 500 includes a graphical representation of a remote control 402, similar to that of FIG. 4. In this example, up arrow button 406 has been selected using the select button 302 from auxiliary remote control 300. In response to this selection, set-top box receiver 104 has darkened the graphical representation of up arrow button 406, and has performed the function corresponding to up arrow button 406.

Depending upon the nature of the function performed by set-top box receiver 104, display 500 may continue showing the graphical representation of a remote control 402 or it may switch to a display corresponding to the function. For example if a channel has been selected for viewing, display 500 will switch to the content of that channel and cease displaying the graphical representation of a remote control 402. Likewise, if a programming guide has been selected, display 500 will switch to the programming guide. In some other examples, the graphical representation of a remote control 402 may be modified in size and location within display 500 so that other information, such as a programming guide, may be shown in addition to the graphical representation.

FIG. 6 is a block diagram of a set-top box receiving system 600 similar to that illustrated in FIG. 1. In this example, set-top box receiving system 600 includes set-top box receiver 604 and display 602. Set-top box receiver 604 includes processor 606, front panel controls 608, input port 610, auxiliary input port 612, and output port 626.

Output port 626 of set-top box receiver 604 is coupled to display 602 through link 618, typically a video cable. Remote control 614 is coupled to input port 610 through link 622, and auxiliary remote control 616 is coupled to auxiliary input port 612 through link 624. Links 622 and 624 may be wired or wireless links. Some links may operate through infrared signals, while others may use radio frequency signals. Still other links may be directly wired.

In some embodiments, input port 610 is also termed a first port, auxiliary input port 612 is termed a second port, and output port 626 is termed a third port. Remote control 614 may be referred to as a first remote control, while auxiliary remote control 616 may be referred to as a first remote control. Such an embodiment is illustrated in FIG. 1 and described in detail above.

Processor 606 is electrically coupled with input port 610, auxiliary input port 612, and output port 626. In this example, set-top box receiver 604 includes a quantity of front panel controls 608. Front panel controls 608 are coupled to processor 606 through auxiliary input port 612 and may act as an auxiliary remote control in some examples. Remote control 614 includes control devices (not shown) such as buttons used for controlling set-top box receiver 604. Front panel controls 608 include a subset of the control devices present in remote control 614. For example, these front panel controls 608 may include a power switch, direction controls, and a select button, while remote control 614 may include a large number of additional control devices used to access all of the functionality present in set-top box 604.

When remote control 614 is misplaced, a user may be unable to access all of the functionality present in set-top box 604. By displaying an interactive graphical representation 620 of remote control 614 on display 602, and allowing the use of auxiliary remote control 616, a user is able to access all of the functionality of set-top box 604. For example, set-top box receiver 604 may create a graphical representation 620 of remote control 614 and send it to output port 626 for viewing on display 602, such as the display illustrated in FIGS. 4 and 5.

In this example, processor 606 is configured to receive control signals from auxiliary remote control 616 through auxiliary input port 612 and to modify the graphical representation of remote control 614 on display 602 in response to these control signals. Auxiliary remote control 616 may be any of a wide variety of control devices. For example, a set of front panel controls, a computer mouse, a joystick, a video game controller, a television controller, a remote control for a different set-top box, or the like may all be used as auxiliary remote controls in various embodiments of set-top box receiving system 600.

Various embodiments of auxiliary input port 612 may include one or more different input ports. For example, in order to allow the use of a wide range of auxiliary remote controls, auxiliary input port 612 may include a Universal Serial Bus (USB) port, an infrared port, and a radio frequency port. Other examples may use other types and configurations of auxiliary input ports 612 as desired.

In an example, front panel controls 608 may include sufficient controls to operate as an auxiliary remote control. In this case, set-top box receiver 608 may not necessarily include an external auxiliary input port 612, but use the front panel controls 608 as the auxiliary remote control 616.

In still other examples, input port 610 and auxiliary input port 612 may be physically combined into a single input port capable of receiving control signals from both remote control 614 and auxiliary remote control 616. Input port 610 and auxiliary input port 612 are illustrated in FIG. 6 as physically separate devices for purposes of clarity.

When set-top box receiver 604 is responding to an auxiliary remote control 616, it displays a graphical representation 620 of remote control 614 (or any other remote control) on display 602. This graphical representation 620 is modified by set-top box receiver 604 responsive to the control signals from auxiliary remote control 616. For example, auxiliary remote control 616 may include up, down, left, right, and select controls. An example auxiliary remote control 616 is illustrated in FIG. 3. The graphical representation 620 of remote control 614 includes a cursor indicating one of the buttons on the graphical remote control 620. When the up, down, left, and right controls are selected on auxiliary remote control 616, the cursor on the graphical representation 620 moves to a different button according to the direction selected.

When the cursor is located on a graphical representation of a button that the user wishes to select, the select control on the auxiliary remote control 616 may be pressed. This causes auxiliary remote control 616 to send a control signal to set-top box receiver 604. In response to this control signal, set-top box receiver 604 performs the function corresponding to the button selected on the graphical representation 620 of remote control 614. In this manner, a user may operate set-top box receiver 604 to perform any operation available from remote control 614. The graphical representation 620 of remote control 614 on display 602 may be in any size, shape, and location as necessary in any particular embodiment.

Set-top box receiver 604 may contain additional elements not illustrated in FIG. 6 for purposes of clarity. These elements may include a down-converter, one or more tuners, a demodulator, demultiplexer, decryption circuit, audio and video decoders, and the like, for receiving the satellite signals and transferring them to the television or other output device.

In one embodiment, processor 606 may be one or more microprocessors, microcontrollers, digital signal processors (DSPs), or any other processor configured to execute software instructions for performing the various tasks identified with the processor 606, such as coordinating the activities of the other components of the set-top box receiver 604, as well as the specific operations discussed in greater detail below. The software may be stored in a data storage device, or a memory located internal to the processor 606. In another example, processor 606 may be a collection of hardware logic circuitry to perform the functions described below, or a combination of software and hardware elements.

In some examples, the graphical representation 620 of a remote control on display 602 may be a representation of a remote control different from the remote control 614 in possession of the user. This allows a user to test the functionality of various different remote controls prior to purchasing an additional remote control.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a media content receiving system, the method comprising:
outputting a first graphical representation corresponding to a first remote control of the media content receiving system to a display device with a display,
wherein the first graphical representation of the first remote control is presented on the display,
wherein the first graphical representation of the first remote control includes a plurality of graphically represented buttons corresponding to a plurality of buttons of the first remote control, and
wherein the first graphical representation of the first remote control includes a representation of a graphical cursor that indicates a first selectable one of the plurality of graphical buttons of the first graphical representation of the first remote control;
receiving a control signal at one of an input port or at least one front panel control,
wherein the control signal that is received at the input port is received from a second remote control,
wherein the control signal that is received at the at least one front panel control is received in response to user actuation of the front panel control,
wherein the control signal corresponds to one of an up direction that is configured to cause a graphical cursor to move in the up direction, a down direction that is configured to cause a graphical cursor to move in the down direction, a left direction that is configured to cause a graphical cursor to move in the left direction, and a right direction that is configured to cause a graphical cursor to move in the right direction; and
outputting a second graphical representation of the first remote control, wherein the second graphical representation of the first remote control is presented on the display in response to receiving the control signal from the second remote control or the at least one front panel control,
wherein the graphical cursor presented on the first graphical representation is moved to an adjacent one of the plurality of graphical buttons in accordance with the corresponding direction of the received control signal, and
wherein the moved graphical cursor indicates that the adjacent graphical button is a second selectable one of the plurality of graphical buttons presented on the second graphical representation.

2. The method of claim 1, wherein the control signal received from the second remote control is a first control signal, and further comprising:
receiving a second control signal at one of the input port or the at least one front panel control,
wherein the second control signal that is received at the input port is received from the second remote control,
wherein the second control signal that is received at the at least one front panel control is received in response to a second user actuation of the at least one front panel control; and operating the media content receiving system in accordance with a function associated with the second selectable one of the plurality of graphical buttons in response to receiving the second control signal.

3. The method of claim 1, further comprising:
identifying a function performed by the media content receiving system, wherein the identified function corresponds to the second selectable one of the plurality of graphical buttons indicated on the presented second graphical representation of the first remote control;
associating the graphical cursor with the function; and
performing the function in response to receiving the second control signal, wherein the performed function operates the media content receiving system.

4. The method of claim 1, wherein the control signal received from the second remote control is a first control signal, and further comprising:
receiving a second control signal at one of the input port or the at least one front panel control,
wherein the second control signal that is received at the input port is received from the second remote control,
wherein the second control signal that is received at the at least one front panel control is received in response to a second user actuation of the at least one front panel control; and
operating the display in accordance with a function associated with the second selectable one of the plurality of graphical buttons in response to receiving the second control signal.

5. The method of claim 4, further comprising:
identifying a function performed by a presentation device operating the display, wherein the identified function corresponds to the second selectable one of the plurality of graphical buttons indicated on the presented second graphical representation of the first remote control;
associating the graphical cursor with the function; and
performing the function in response to receiving the second control signal, wherein the performed function operates the display.

6. The method of claim 1, wherein the input port is configured to use a wireless link for receiving wireless control signals from the first remote control, and wherein receiving the control signal from the second remote control further comprises:
receiving a wireless control signal from the second remote control at the input port.

7. The method of claim 1, wherein the input port is the only wireless link input port for receiving wireless control signals.

8. The method of claim 1, wherein the second remote control is a joystick that communicates wireless control signals, and wherein the control signal received from the second remote control is generated by one of a first movement of the joystick that corresponds to the up direction, a second movement of the joystick that corresponds to the down direction, a third movement of the joystick that corresponds to the left direction, and a fourth movement of the joystick that corresponds to the right direction.

9. The method of claim 1, wherein the second remote control is a computer mouse that communicates wireless control signals, and wherein the control signal received from the second remote control is generated by one of a first movement of the computer mouse that corresponds to the up direction, a second movement of the computer mouse that corresponds to the down direction, a third movement of the computer mouse that corresponds to the left direction, and a fourth movement of the computer mouse that corresponds to the right direction.

10. The method of claim 1, wherein the second remote control is a video game controller that communicates wireless control signals, and wherein the control signal received from the second remote control is generated by actuation of a first button of the video game controller that corresponds to the up direction, is generated by actuation of a second button of the video game controller that corresponds to the down direction, is generated by actuation of a third button of the video game controller that corresponds to the left direction, and is generated by actuation of a fourth button of the video game controller that corresponds to the right direction.

11. A media content receiver, comprising:
a processor;
a wireless signal input port electrically coupled to the processor, and configured to receive wireless control signals, wherein the wireless control signals are generated by a first remote control configured to control operation of the media content receiver;
at least one front panel control electrically coupled to the processor, and configured to receive user control signals, wherein the user control signals are received at the at least one front panel control in response to user actuation of the front panel control; and
an output port electrically coupled to the processor, configured to communicate graphical representations of the first remote control to a display, wherein the graphical representations of the first remote control represented on the display include a plurality of graphical buttons each associated with control buttons of the first remote control, and wherein the graphical representations of the first remote control include a graphical cursor that identifies a currently selectable one of the plurality of graphical buttons,
wherein the processor is configured to:
generate a first graphical representation of the first remote control, wherein a first graphical button is indicated by the graphical cursor as selectable;
process control signals received at the wireless signal input port from a second remote control that is configured to control another electronic device,
wherein the second remote control is not configured to output a command to control an operation of the media content receiver, and
wherein the second remote control includes at least one direction control button configured to cause the graphical cursor to move in one of an up direction, a down direction, a left direction and a right direction,
process the user control signals received at the at least one front panel control,
wherein the at least one front panel control is configured to control an operation of the media content receiver, and
generate a second graphical representation of the first remote control responsive to a control signal received from one of the second remote control or the at least one front panel control, wherein the graphical cursor presented on the first graphical representation is moved to an adjacent graphical button in accordance with the corresponding direction of the control signal, and wherein the moved graphical cursor indicates that the adjacent graphical button is a second selectable graphical button.

12. The media content receiver of claim 11, wherein the at least one front panel control comprises a plurality of front panel controls, and wherein the plurality of front panel controls include at least one direction control button configured to cause the graphical cursor to move in one of the up direction, the down direction, the left direction and the right direction.

13. The media content receiver of claim 11, wherein the control signal received from the second remote control is a first control signal, wherein the second remote control includes a select button which corresponds to a selection of a function currently associated with the graphical button currently identified by the graphical cursor, and wherein the processor is further configured to:
operate one of the media content receiver and the display in accordance with a function associated with the graphical button currently identified by the graphical cursor responsive to a second control signal received from the second remote control, wherein the second control signal is generated in response to user selection of the select button on the second remote control.

14. The media content receiver of claim 11,
wherein the second remote control is a joystick that communicates wireless control signals, and wherein the control signal received from the second remote control is generated by one of a first movement of the joystick that corresponds to the up direction, a second movement of the joystick that corresponds to the down direction, a third movement of the joystick that corresponds to the left direction, and a fourth movement of the joystick that corresponds to the right direction.

15. The media content receiver of claim 11, wherein the second remote control is a computer mouse that communicates wireless control signals, and wherein the control signal received from the second remote control is generated by one of a first movement of the computer mouse that corresponds to the up direction, a second movement of the computer mouse that corresponds to the down direction, a third movement of the computer mouse that corresponds to the left direction, and a fourth movement of the computer mouse that corresponds to the right direction.

16. The media content receiver of claim 11, wherein the second remote control is a video game controller that communicates wireless control signals, and wherein the control signal received from the second remote control is generated by actuation of a first button of the video game controller that corresponds to the up direction, is generated by actuation of a second button of the video game controller that corresponds to the down direction, is generated by actuation of a third button of the video game controller that corresponds to the left direction, and is generated by actuation of a fourth button of the video game controller that corresponds to the right direction.

17. A method for operating a media content receiver, wherein the media content receiver includes an input port configured to communicate using a wireless link and at least one front panel control configured to receive user inputs, wherein the input port is configured to receive control signals from a first remote control configured to control the media content receiver so that the media content receiver performs at least one function associated with the received control signals, and wherein the at least one front panel control is configured to receive control signals in response to actuation by a user, the method comprising:
receiving a first control signal from the first remote control at the input port via the wireless link;
performing at least one function at the media content receiver based on the first control signal;

receiving a second control signal from a second remote control at the input port via the wireless link, wherein the second remote control is configured to communicate using the input port;

transmitting a first graphical representation of a third remote control from the media content receiver to a display in response to receiving the second control signal, wherein the third remote control is different from the first remote control, and wherein the first graphical representation of the third remote control includes a plurality of graphically represented buttons and a cursor, and wherein the cursor indicates a selectable first graphically represented button of the third remote control;

receiving a third control signal from the second remote control at the input port, wherein the third control signal causes movement of the cursor to an adjacent one of the plurality of graphically represented buttons of the third remote control;

generating a second graphical representation of the third remote control in response to the third control signal, wherein the adjacent graphically represented button of the third remote control becomes selectable based on a received fourth control signal from the second remote control; and transmitting the second graphical representation of the third remote control to the display, wherein the cursor identifies the adjacent graphically represented button.

18. The method of claim 17, wherein the third remote control is of a different type than the second remote control.

19. The method of claim 17, wherein the second remote control comprises a select controller, and further comprising:

identifying a function of the adjacent graphically represented button of the third remote control;

associating the cursor with the function;

receiving a fourth control signal from the second remote control at the input port, wherein the fourth control signal is initiated in response to a user selection of the select controller on the second remote control; and performing a function in response to receiving the fourth control signal, wherein the performed function is associated with the adjacent graphically represented button of the third remote control.

20. The method of claim 17, wherein the second remote control includes a first direction control button configured to cause the cursor to move in an up direction, includes a second direction control button configured to cause the cursor to move in a down direction, includes a third direction control button configured to cause the cursor to move in a left direction, and includes a fourth direction control button configured to cause the cursor to move in a right direction, and further comprising:

receiving the third control signal based upon user selection of the first direction control button, wherein the moved cursor indicates that the second selectable graphical button is above the previously indicated selectable first graphical button;

receiving the third control signal based upon user selection of the second direction control button, wherein the moved cursor indicates that a second selectable graphical button is below the previously indicated selectable first graphical button;

receiving the third control signal based upon user selection of the third direction control button, wherein the moved cursor indicates that the second selectable graphical button is left of the previously indicated selectable first graphical button; and receiving the third control signal based upon user selection of the fourth direction control button, wherein the moved cursor indicates that the second selectable graphical button is right of the previously indicated selectable first graphical button.

* * * * *